United States Patent
Herring et al.

(10) Patent No.: US 9,515,470 B2
(45) Date of Patent: Dec. 6, 2016

(54) CABLE GROMMET ASSEMBLY WITH SLEEVE AND INTERNAL RETAINING RING

(71) Applicant: Next Technologies, Inc., Georgetown, TX (US)

(72) Inventors: Jason Brian Herring, Georgetown, TX (US); Shane Michael Gilbreath, Georgetown, TX (US)

(73) Assignee: Spindle 360, Inc., Georgetown, TX (US)

( * ) Notice: Subject to any disclaimer, the term of this patent is extended or adjusted under 35 U.S.C. 154(b) by 204 days.

(21) Appl. No.: 14/244,119

(22) Filed: Apr. 3, 2014

(65) Prior Publication Data

US 2015/0282611 A1    Oct. 8, 2015

(51) Int. Cl.
*H02G 3/22* (2006.01)
(52) U.S. Cl.
CPC ......... *H02G 3/22* (2013.01); *A47B 2200/0082* (2013.01); *Y10T 16/05* (2015.01); *Y10T 29/49908* (2015.01)
(58) Field of Classification Search
CPC .... H02G 3/00; H02G 3/22; A47B 2200/0082; Y10T 29/49908; Y10T 16/05
USPC .. 29/525.01, 525.02, 453; 174/152 G, 153 G
See application file for complete search history.

(56) References Cited

U.S. PATENT DOCUMENTS

| | | | | |
|---|---|---|---|---|
| 2,170,708 A * | 8/1939 | Cordeiro | ............ | A44B 13/0082 16/2.1 |
| 4,144,616 A * | 3/1979 | Gould | ............ | H02G 3/083 16/2.1 |
| 5,280,138 A * | 1/1994 | Preston | ............ | B65H 57/10 16/2.1 |
| 6,460,638 B1 * | 10/2002 | Strunsee | ............ | H02G 3/083 16/2.2 |
| 7,124,468 B2 | 10/2006 | Mockett | | |
| 8,399,770 B1 * | 3/2013 | Phillips, Jr. | ............ | F16B 7/182 174/142 |
| 2008/0290611 A1 * | 11/2008 | Dukes | ............ | H02G 3/22 277/637 |
| 2009/0090073 A1 * | 4/2009 | Bravo | ............ | E04F 15/0247 52/220.1 |
| 2010/0126768 A1 * | 5/2010 | Dukes | ............ | H02G 3/22 174/650 |

* cited by examiner

*Primary Examiner* — David Bryant
*Assistant Examiner* — Lawrence Averick
(74) *Attorney, Agent, or Firm* — Kevin Keener; Keener and Associates P.C.

(57) ABSTRACT

A grommet assembly, such as for height adjustable desks, comprising the components: a universal cylindrical desktop grommet; a grommet flat plate (optional) with a centrally located aperture, and affixed to the underside of the desk aperture; a grommet fabric sleeve configured as a vertically oriented housing suspended downward from the desktop aperture comprising a cylindrical exterior and interior side wall; and, an internal retaining ring encased between two folds within the sleeve interior side wall by folding the sleeve top end inward and downward, the retaining ring functioning to hold the sleeve in position with the desktop aperture. The grommet assembly allows cables to move up/down within a grommet sleeve easily, unimpeded while protecting the cable(s) from damage due to abrasive surface contact and bending of the cable. This is especially suitable for height adjustable desks to allow free movement of the cable as the desk moves up/down.

19 Claims, 8 Drawing Sheets

CABLE GROMMET ASSEMBLY WITH SLEEVE AND INTERNAL RETAINING RING

FIELD OF THE DISCLOSURE

The present disclosure relates to a cable grommet assembly used in the furniture industry to prevent computer cables from being damaged and/or impinged.

BACKGROUND OF THE DISCLOSURE

Professional office furniture comprising desks are primarily designed to support desktop or laptop computers. These computers function with one or more cables running from the back of the computers to electric power outlets, data storage devices, and/or multifunctional printing devices that are normally situated below the desk. Therefore, furniture manufactured today normally comprises an aperture within the top surface of the desk near the location of the computer that permits the passage of the computer cables through the desktop to the floor on the undersurface of the desk. This aperture also adds to the aesthetic appearance of the desk by removing the cables from view.

The desktop aperture is covered with a desktop grommet, a wide variety of which are commercially available. A desktop grommet normally comprises a flat cylindrical cover connected permanently or removable to a hollow, cylindrical side wall housing (or flange) that snaps into the desktop aperture. The grommet is size matched to the desktop aperture to ensure that the grommet lies flat with the desktop surface for aesthetic purposes and to prevent any sharp projections.

The grommet may also comprise a wide variety of covers with an aperture of sufficient size to permit one (ideally) or more electrical cables to pass through the cover. The cover aperture is often semi-circular shaped and residing on the edge of the grommet outer perimeter (see FIG. 1, 60). Often, though, the grommet cover aperture, or the exposed desktop aperture, comprise sharp edges that can damage the cables due to their repeated rubbing against them, which can abrade the cables' outer material. The cables can also become damaged by excessive bending of the cables within the grommet cover. This is especially a problem with height adjustable desks whose repeated up/down motion can tug on and possibly impinge the cable as it passes over the grommet aperture edges.

In an attempt to reduce damage to the cables, the use of fabric sleeved grommets has been implemented in the industry to protect the cables. A sleeve comprising a hollow, cylindrical housing made from flexible, expandable material, which is often seamless, extends from the desktop aperture, and vertically downward underneath the desk. The computer's cables are then passed through and reside within the sleeve, whose smooth material reduces damage to the cables.

There is a difficulty, though, in securing the sleeve within the desktop aperture in a time and cost efficient manner that hides the top end of the sleeve from view. The exposure of the sleeve top end leads to excessive wear and tear which results in unsightly fraying of the sleeve material. One method to secure the sleeve is to tie the top end of the expandable sleeve to the cables using, for example, zip ties. Unfortunately, this often causes the sleeve to slide up and down the cable, thus reducing its ability to protect the cable, especially from the grommet cover's and desktop aperture's top edges. This is also especially problematic with height adjustable desks where the cable moves up/down through the sleeve each time the desk is raised or lowered.

Therefore, there is a need within the furniture industry to design a means for fixing a grommet sleeve in place within a desktop grommet aperture in a cost effective and aesthetic manner that secures the sleeve, and that can be used with a wide variety of cylindrical desktop grommets. This is especially needed for use with height adjustable desks to allow the cable to move up/down within the sleeve unimpeded because the sleeve is not attached to the cable.

SUMMARY OF THE DISCLOSURE

The present disclosure teaches various embodiments of a universal wire management grommet assembly for protecting electrical cables, such as those found on computer desks. The grommet assembly comprises the following components: a universal cylindrical desktop grommet; a grommet flat plate (that is optional) with a centrally located aperture, in which the plate is affixed to the underside of the desk aperture; a grommet fabric sleeve configured as a vertically oriented housing suspended downward from the desktop aperture and comprising a cylindrical interior and exterior side wall; and, an internal retaining ring housed within the sleeve top end by folding the sleeve top end inward, the retaining ring functioning to hold the sleeve in position within the desktop aperture. All of assembly components are inserted within, or are covering, or are suspended from a desktop grommet aperture.

The cylindrical grommet is suitably sized for use in a desktop aperture to pass electrical cables and end plugs through the desktop to a power outlet residing below the desk. A multitude of desktop cylindrical grommets are commercially available and envisioned for use with the presently disclosed grommet assembly. Hence, the various embodiments disclosed herein comprise a "universal" desktop grommet.

The desktop grommet diameter is substantially similar to the diameter of the desktop aperture and the retaining ring, such that the grommet and retaining ring fit snuggly within the desktop aperture.

Retaining Ring

The retaining ring is inserted inside of the grommet sleeve, and positioned such that the top end of the sleeve is folded over the ring and into the interior of the cylindrical sleeve. As a result, the top ends of the sleeve are not exposed and thus protected from damage due to wear and tear.

The retaining ring locks into place within the desktop aperture thus preventing the ring and the attached sleeve from moving up or down or rotating with the aperture. This enables one or more electrical cables to pass through the ring/sleeve unconnected to and unimpeded by them.

The retaining ring is installed axially (i.e. horizontally along a center point of the vertical desk aperture axis) with the ring outer edge in direct contact with the desktop aperture interior wall. The retaining ring is locked into place within the desktop aperture by a variety of means well known in the art, and which may largely depend upon: the type of retaining ring; whether a grommet flat plate is used with a marginally smaller aperture diameter than the desktop aperture; whether a ledge or groove is created in the desktop aperture interior wall to fit the retaining ring; etc.

A variety of types of retaining rings are envisioned for use with the presently disclosed grommet assembly. For example, the ring may be a spiral retaining ring with 360 degrees circumference, or it may comprise a small opening within its circumference to create two opposing ends. The ends may be equal in shape, or one or both ends may comprise a shape (e.g. a tapered end) to assist in using a tool to maneuver the ring.

In one non-limiting example, a ledge or groove is carved into the desktop aperture interior wall that is of sufficient size to permit the retaining ring to rest atop of (i.e. the ledge) or to fit within (i.e. the groove).

In another non-limiting example, the retaining ring does not require a ledge or groove carved into the desktop aperture to fit into. It may merely snap into place against the flat cylindrical interior wall of the desktop aperture without any other means to hold it (and the attached grommet sleeve) in place. The retaining ring may, for example, comprise a flat coiled spring wire that generates an outward radial force against the desktop aperture interior wall.

In another non-limiting example, the retaining ring rests against the grommet flat plate that is affixed to the underside of the desk. In this embodiment, the diameter of the plate aperture is slightly less than the desktop aperture to create a ledge on the plate for the ring to rest upon.

It is understood that the underside grommet flat plate is optional. Embodiments of the present disclosure that replace the flat plate with other means of securing the retaining ring and grommet sleeve within the desktop aperture permit the flat plate to be omitted from the grommet assembly.

One object of the present disclosure is to provide a grommet assembly that allows a cable to move up/down within a grommet sleeve easily, unimpeded. This is especially suitable for height adjustable desks to allow free movement of the cable as the desk moves up/down.

Another object of the present disclosure is to provide a grommet assembly utilizing a universal grommet, in which the term "universal" indicates that the assembly may comprise a wide variety of cylindrical desktop grommets.

Another object of the present disclosure is to provide a universal grommet assembly that protects the cable(s) from damage due to abrasive surface contact and bending of the cable.

Another object of the present disclosure is to provide a cost and time efficient means to secure a grommet sleeve in place so that it may not: move up/down, or rotate, or otherwise dislodge from the desktop aperture.

Still a further object of the present disclosure is to provide an aesthetically appearing grommet sleeve. Folding the sleeve top end inward and over the retaining ring ensures that the top end of the sleeve is not exposed and thus is not prone to wear and tear that may lead to fraying.

BRIEF DESCRIPTION OF THE DRAWINGS

The above and other features, aspects, objectives and advantages of the present disclosure will become better understood with regard to the following description, appended claims, and accompanying drawings where:

DETAILED DESCRIPTION OF EXAMPLE EMBODIMENTS

Figure 1:
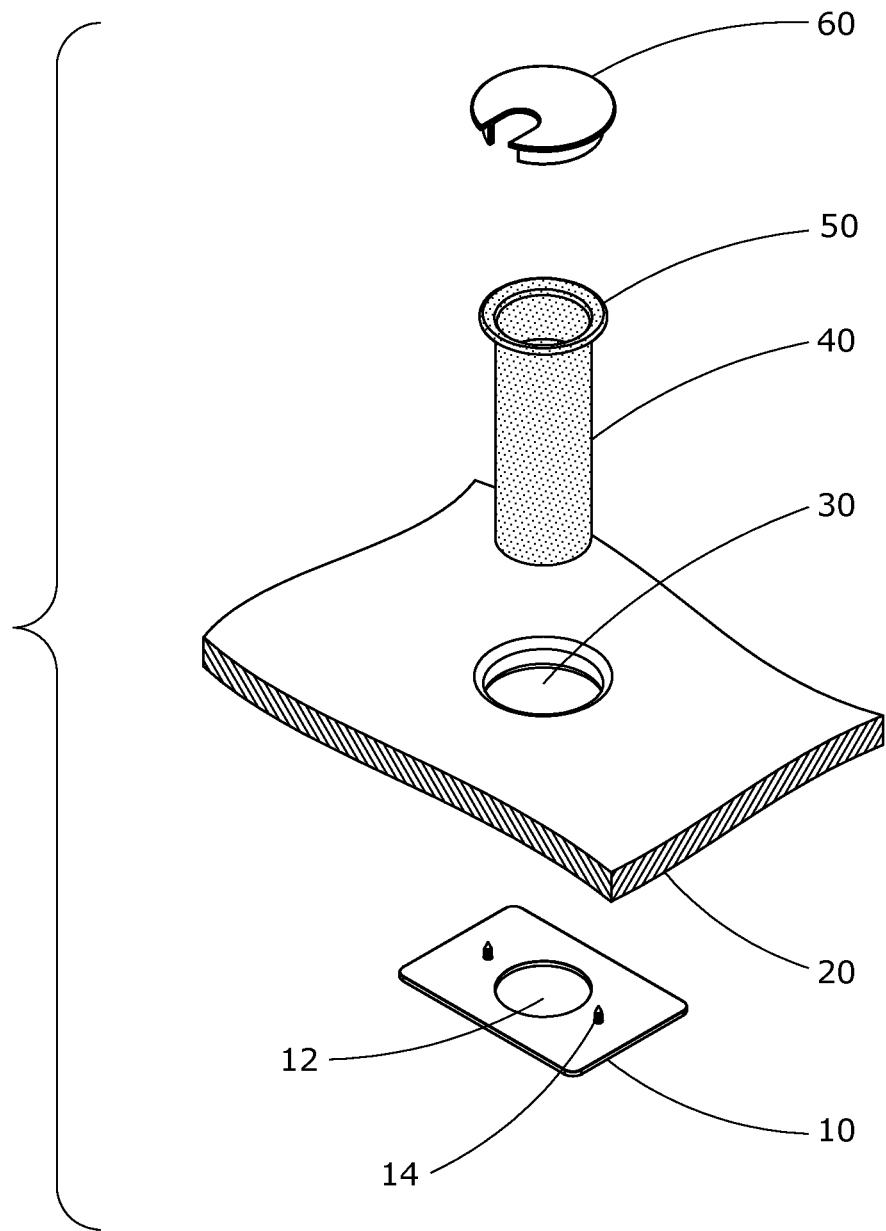
FIG. 1 is a top perspective exploded view an expandable sleeve opened and the retaining ring in place inside the sleeve and with the grommet plate unattached.

The present disclosure comprises various embodiments of the grommet assembly comprising the components: a universal cylindrical desktop grommet 60; a grommet flat plate 10 with an aperture 12, in which plate 10 is affixed to the desk underside by aligning the aperture 12 with the desktop aperture 30; a grommet fabric sleeve 40 configured as a vertically oriented housing suspended downward from the desktop aperture 30 in which the sleeve 40 comprises a cylindrical exterior side wall 40a and an interior side wall 40b; and, an internal retaining ring 50 encased within a fold of the sleeve interior side wall 40b that is created by bending the sleeve's top end inward and downward 180 degrees.

Various means exist to the skilled artisan to secure the retaining ring 50 and the sleeve 40 within the desktop aperture 30. By way of a non-limiting example, the universal grommet assembly may comprise a ledge or grooved installed within the interior walls of the desktop aperture 30 to secure the retaining ring 50 and grommet sleeve 40 into position. Or the retaining ring 50 may generate an outward radial force against the interior wall, or be tightly fitted with the desktop aperture 20, to prevent its movement. Or the retaining ring 50 may rest against the top surface of the grommet flat plate 10 when the plate aperture 12 is marginally smaller in diameter than the desktop aperture 30, thus creating a ledge (see FIG. 2, 10a).

FIGS. 1-8 illustrate one exemplified embodiment of the grommet assembly comprising: a cutout of a section of a desktop surface 20 comprising a desktop aperture 30 of sufficient diameter to house a cylindrical grommet 60, such as any one of a wide variety commercially available grommets utilized for passing desktop or laptop computer cables through a desktop aperture.

Figure 3:
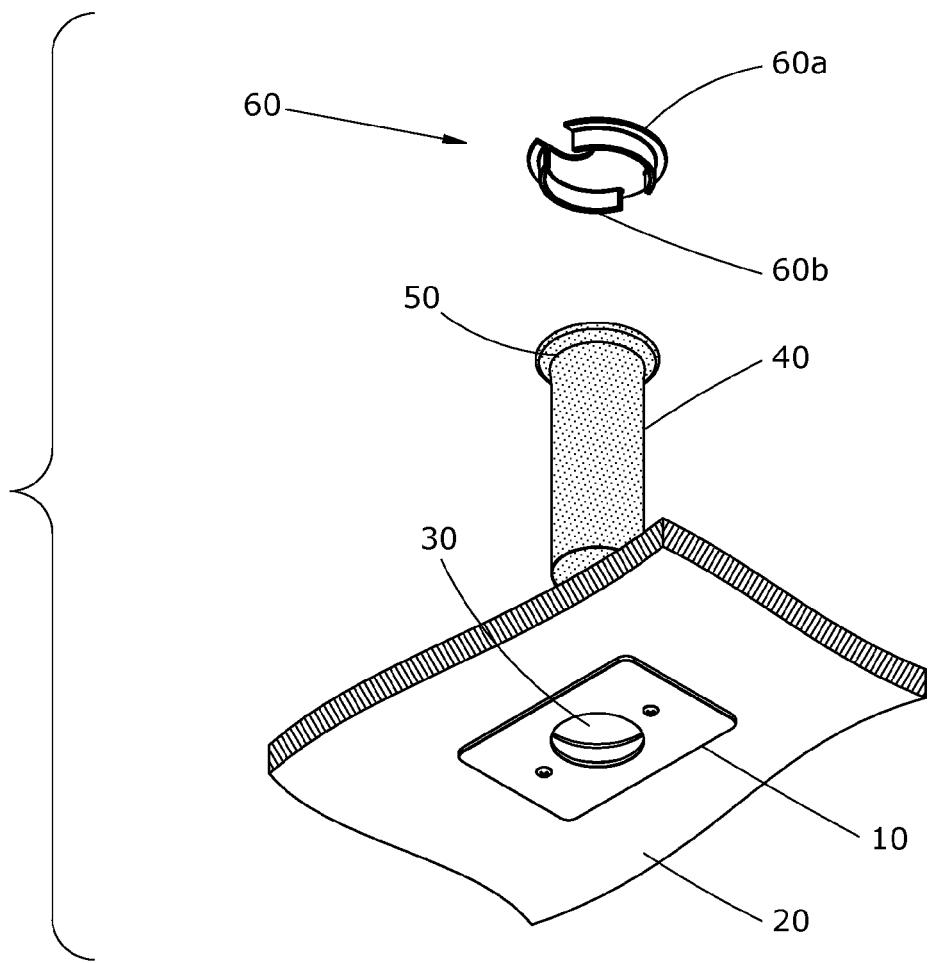
FIG. 3 is a bottom perspective exploded view with the expandable sleeve opened and the retaining ring in place inside the sleeve, and the retaining plate fixed to the undersurface of the desk.
Figure 4:
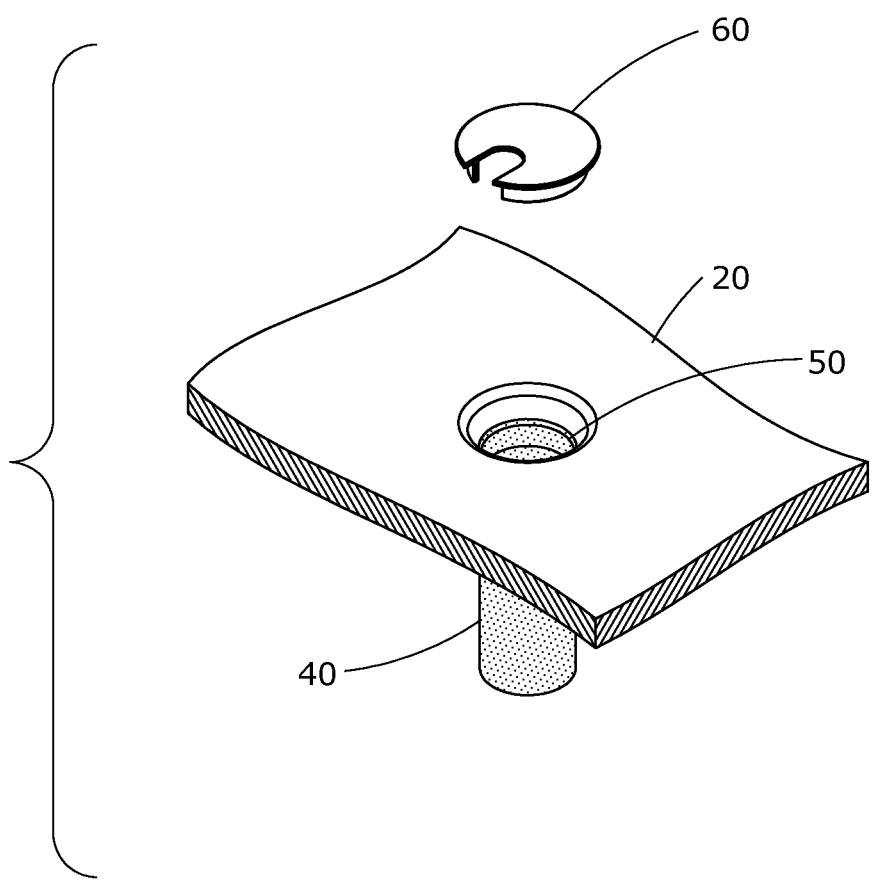
FIG. 4 is a top perspective exploded view with the expandable sleeve wrapped around the retaining ring, inserted into desk aperture, and the lower grommet plate attached to the undersurface of the desk.
Figure 5:
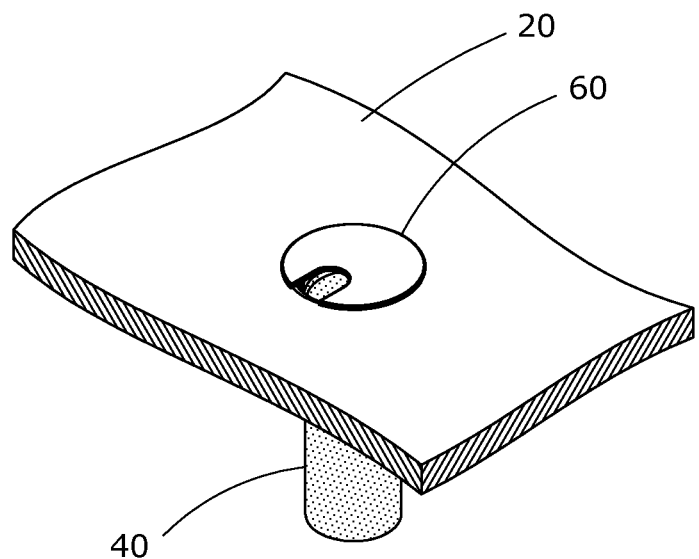
FIG. 5 is a top perspective view of the grommet assembly.

As illustrated in FIG. 3, the exemplified "universal" grommet 60 comprises a flat cover 60a connected on the underside to a hollow housing with a cylindrical side wall 60b that snaps into the desktop aperture 30. It is noted that grommets fitting desktop apertures are well known in the art and comprise primarily two types: one in which the cover 60a and 60b are one unit, and ones in which they are separable units. The various embodiments of the grommet assembly disclosed herein are suitable for use with a wide variety of these commercially available cylindrical grommets, including these two primary types. It is also noted that the various embodiments of the present disclosure may be used in conjunction with just a grommet cover 60a, or the like, wherein the retaining ring 50 and sleeve 40 function to protect the interior wall of the desk grommet in lieu of a grommet housing 60b.

Grommet 60 may or may not make contact with the top surface of the sleeve 40 and retaining ring 50. For example, in a thick desktop, the length of the desktop aperture 30 may be sufficient to allow the grommet side wall 60*b* to reside above the sleeve 40 and the retaining ring 50.

As illustrated in FIG. 1, the assembly may further comprise a flat grommet plate 10 which comprises an aperture 12 in the middle of the plate 10 that size matches the diameter of the desktop aperture 30, or is slightly smaller in diameter. In the later version, the retaining ring 50 within the sleeve 40 may rest against a ledge 10*a* created by having the diameter of the plate 10 marginally smaller than (e.g. millimeters of at least the width of the retaining ring) the diameter of the desktop aperture 30 (see FIG. 2, 10*a*).

The grommet plate 10 is permanently affixed to the underside desktop surface so that the plate aperture 12 is aligned with the desktop aperture 30. For example, and as illustrated in FIG. 1, screws 14 may be used to fix the plate. Other means of fixation are well known to the artisan, such as industrial glue, bolts, etc.

Figure 6:
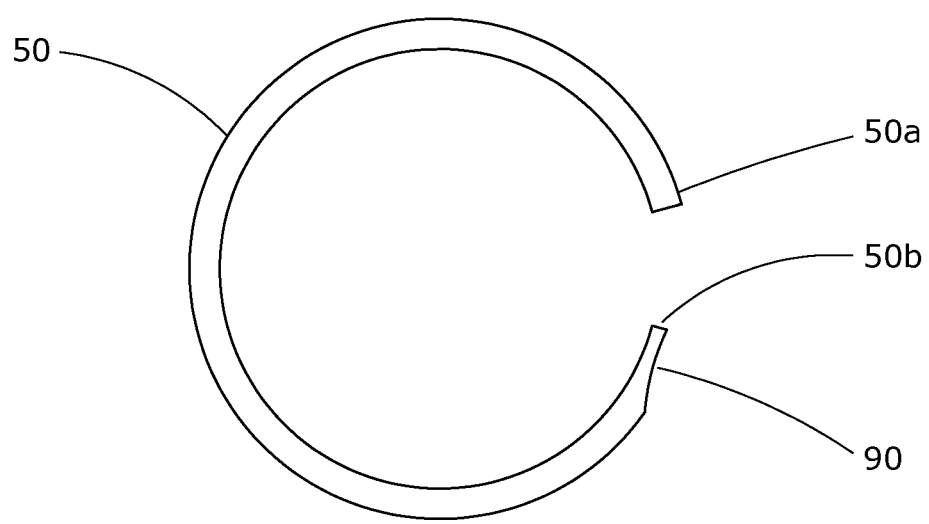
FIG. 6 is a top plane view of one embodiment of the retaining ring.
Figure 7:
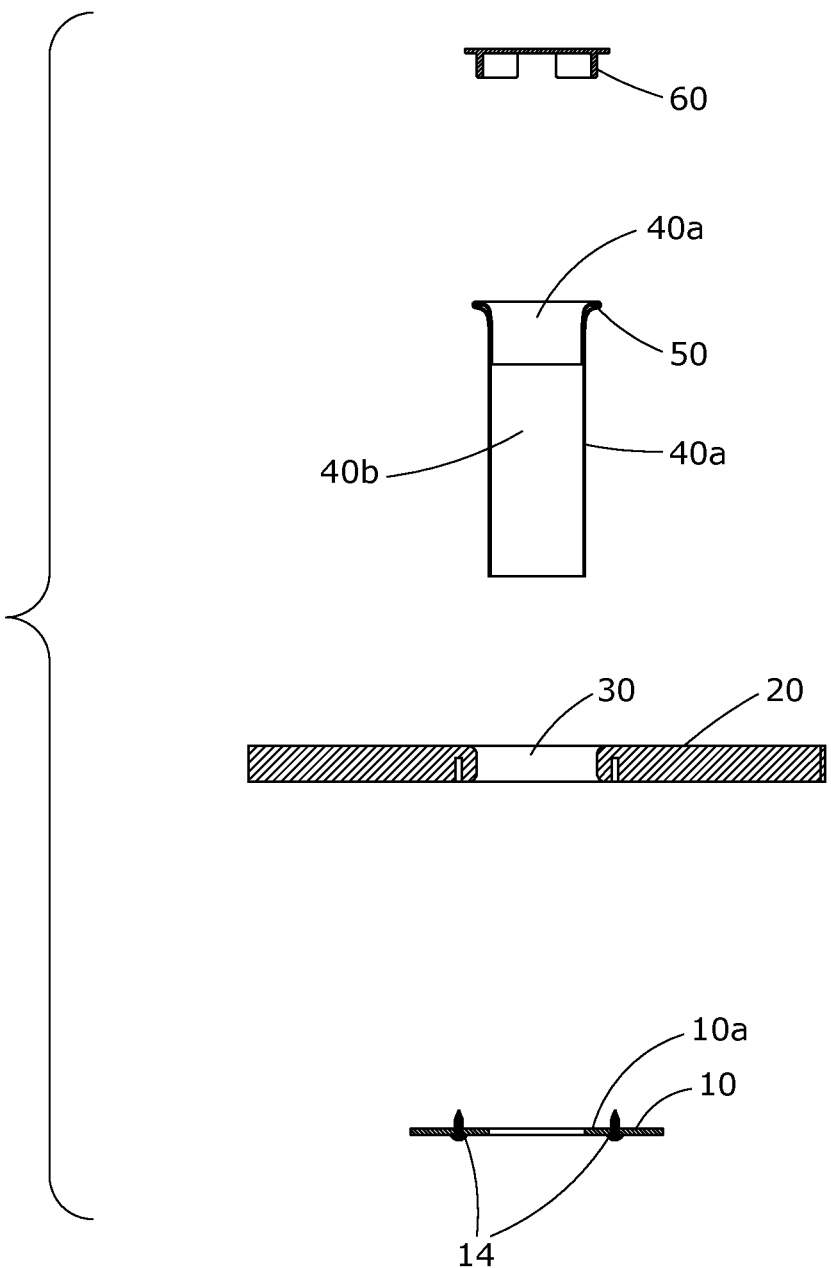
FIG. 7 is a cross-sectional view of FIG. 1 comprising an expandable sleeve opened and the retaining ring in place inside the sleeve and with the grommet plate unattached.

The exemplified assembly further comprises a spiral metal retaining ring 50 with an opening wherein only one of the two ends 50*a,b* is tapered (see FIG. 6, 90). In this embodiment, the retaining ring 50 is secured and/or locks into position within the desktop aperture 30 by generating an outward radial force against the interior wall of the desktop aperture 30.

It is noted that other retaining rings are suitable for use in the present system as long as they function to lock into position the ring 50 and the sleeve 40 within the desktop aperture 30. In all embodiments, the retaining ring is sized to fit the interior diameter of the desktop aperture 30 by making direct contact with the desktop aperture interior wall surface. Thus, different sized desktop-grommet apertures may require different sized retaining rings 50.

Figure 8:
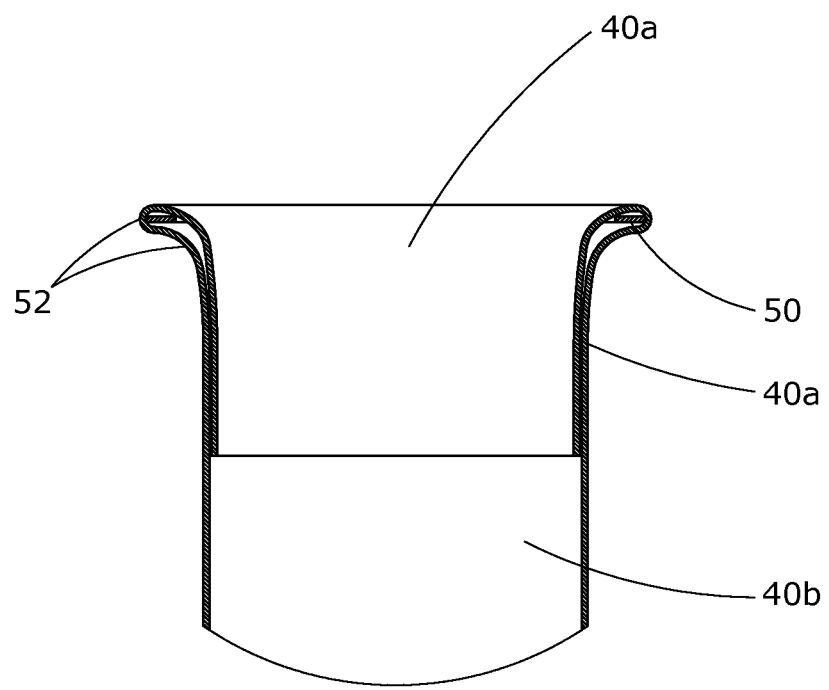
FIG. 8 is a cross-section view of the retaining ring positioned within the sleeve and the sleeve's top end folded inward over the ring.

As illustrated in FIG. 8, the retaining ring 50 is inserted into the grommet sleeve 40 by positioning the ring 50 within the top end of the grommet sleeve 40. It is noted, that is all embodiments of the present disclosure, the sleeve 40 is made from smooth, stretchable, expandable fabric material, such as nylon, polyester, rayon, cotton blends, etc. The retaining ring 50 is inserted a few inches (e.g. 1-4 inches) down from the sleeve top end and is in direct contact with the sleeves interior wall 40*b*. The sleeve top end is then folded inward towards the central axis of the cylindrical sleeve until it touches the interior wall 40*b* beneath the retaining ring. In other words, the sleeve top end is bent 180 degrees inward and downward so that it is facing vertically downward. This results in the retaining ring 50 being encased within a fold between two sleeve interior walls 40*b* to create a flat surface 52 that can be used to secure the ring 50 and sleeve 40 into position with the desktop aperture 30 (e.g. such as via resting the flat surface 52 on the rim of the grommet plate 10*a*, or within a ledge or groove carved into the desktop groove). By way of a non-limiting example for the later, a lip that is about one-sixteenth in diameter and about one-eight inch thick may be created on the bottom of the desktop aperture for the ring flat surface 52 to rest upon. This may be accomplished via the use of a router, or other means widely known to the skilled artisan.

Method of Installation

FIGS. 1-5 illustrate one embodiment for a method of installing the grommet assembly when a grommet flat plate 10 is utilized, for example, in a height adjustable desk that may be repeatedly raised and lowered between a sitting and a standing position. The flat plate 10 comprising a centrally positioned aperture 12 is positioned on the underside of the desk so that the plate aperture 12 is aligned with the desk aperture 30. The flat plate 10 is then secured into position with fixation means well known in the art, such as the exemplified screws (FIG. 1, 14).

After installing the flat plate 10, the grommet sleeve 40 is feed upward through the desktop aperture 30 and pulled through until about 6-12 inches of the sleeve is exposed above the desktop aperture 30. The retaining ring 50 is then inserted into the top end of the grommet sleeve 40 to protect the sleeve top end from fraying (see FIG. 8), and to have the retaining ring 50 support the weight of the sleeve 40 so that sleeve 40 may hang suspended from the ring 50 and below the desktop aperture 30 (see FIG. 4).

Figure 2:
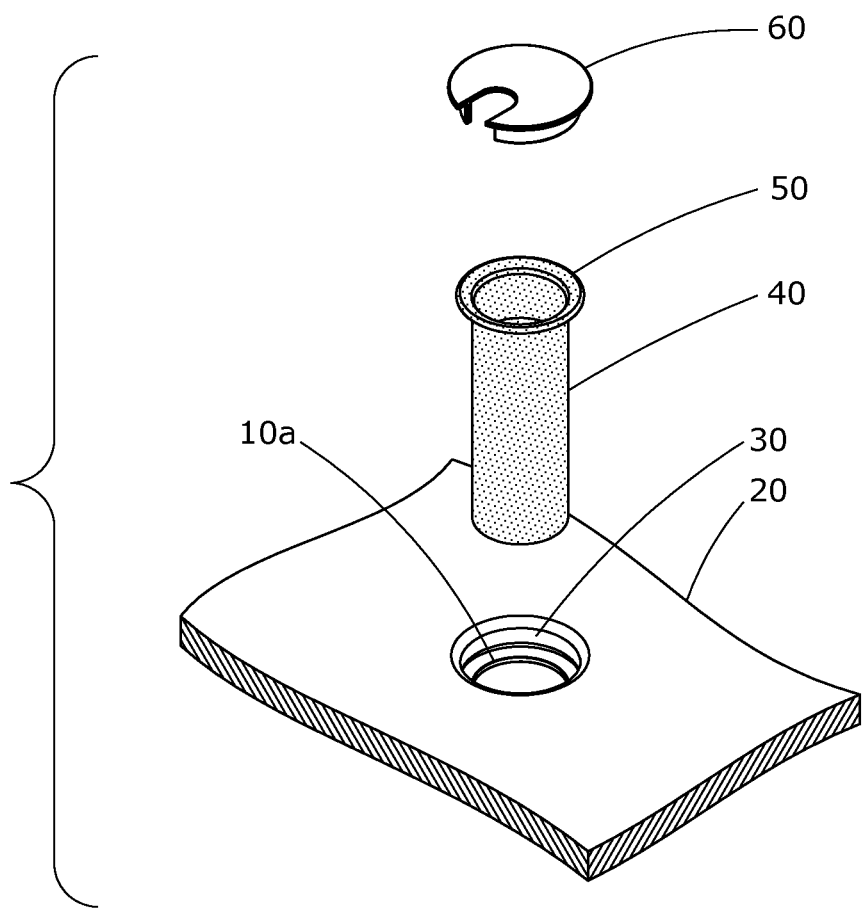
FIG. 2 is a top perspective exploded view with an expandable sleeve opened and the retaining ring in place inside the sleeve, and the grommet plate fixed to the undersurface of the desk.

After the retaining ring 50 is properly in position within a fold of the sleeve 40, the ring 50 and thus the attached sleeve 40 are locked into position within the desktop aperture 30. Various means of locking the ring/sleeve in place are envisioned within the present disclosure. For example, FIG. 2 illustrates one embodiment in which the diameter of the flat plate aperture 12 is marginally smaller than the diameter of the desk aperture 30, thus creating a ledge 10*a* on the flat plate 10 for the retaining ring 50 to rest upon. Or the retaining ring 50 may fit snugly within the interior wall of the desktop aperture 30 and thus not require any additional means to remain in a locked position (e.g. FIG. 3).

The grommet 60 is installed within the desktop aperture 30 after the retaining ring 50 and the sleeve 40 are securely in place within the desktop aperture 30. The grommet 60 may or may not make contact with the retaining ring 50. The grommet cover 60*a* is then lifted off the grommet side wall 60*b* (e.g. flange), and computer cables are feed through the retaining ring 50 and grommet sleeve 40 until the cables are able to connect to a power source or other device beneath or near the desk. When the height adjustable desk is raised, or lowered, the cables will travel up and down through the sleeve 40 unimpeded, without the sleeve 40 adhering to, or otherwise entangling with the cables.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of utilizing a retaining ring to secure a grommet sleeve for a desktop aperture, comprising the steps of,
   providing a retaining ring, comprising a hollow thin, flat, circular ring, wherein the diameter of the retaining ring is substantially similar to the diameter of a desktop aperture extending through the thickness of the top surface of a computer desk;

providing a hollow, cylindrical grommet sleeve comprising expandable fabric material with an interior and exterior side wall;

inserting the retaining ring within the top end of the grommet sleeve, and positioning the ring slightly downward from the top end of the sleeve;

bending the top end of the grommet sleeve inward and downward 180 degrees, wherein the ring becomes encased within a fold between two sleeve interior walls, and the sleeve top end is protected from damage; and, inserting and locking the grommet sleeve and retaining ring into position within the desktop aperture, wherein the sleeve and ring are not able to move up or down or rotate, and the sleeve is vertical suspended downward from the desktop aperture.

2. The method of claim 1 further comprising securing a flat grommet plate to the underside of the desktop aperture before inserting and locking the retaining ring into position, wherein the grommet plate comprises a centrally located aperture extending through the plate thickness comprising an aperture diameter substantially similar or marginally smaller than the diameter of the desktop aperture.

3. The method of claim 2, wherein locking the retaining ring and sleeve into position comprises the retaining ring exerting an outward radial force against the desktop aperture interior wall.

4. The method of claim 2 wherein locking the retaining ring and sleeve into position comprises the retaining ring residing against the top surface of the plate when the diameter of the plate aperture is marginally smaller than the diameter of the desktop aperture.

5. The method of claim 2, further comprising installing a grommet cover into the desktop aperture after the retaining ring and sleeve are locked into position within the desktop aperture, wherein the diameter of the grommet cover is substantially similar to the diameter of the retaining ring and desktop aperture.

6. The method of claim 1, wherein locking the retaining ring and sleeve into position comprises carving a ledge or groove into the desktop aperture and the retaining ring residing against the top surface of the ledge or within the groove to prevent the ring and sleeve from slipping downward.

7. The method of claim 1, wherein the retaining ring further comprises an opening in the perimeter of the ring creating two ring ends of equal shape, or unequal shape wherein one end of the two ring ends is tapered to facilitate removing and installing the ring with a hand tool.

8. The method of claim 1, further comprising installing a grommet into the desktop aperture after the retaining ring and sleeve are locked into position within the desktop aperture, wherein the diameter of the grommet is substantially similar to the diameter of the retaining ring.

9. The method of claim 1, wherein the desk is a height adjustable desk that moves vertically up and down without impinging the cable housed within the grommet sleeve.

10. A grommet assembly for a computer desk, the desk comprising a desktop aperture extending through the thickness of the top surface of the desk configured to pass an electrical cable from the desktop surface to the desk undersurface, and the grommet assembly comprising:

a retaining ring comprising a hollow thin, flat, circular ring, wherein the diameter of the retaining ring is substantially similar to the diameter of the desktop aperture;

a hollow, cylindrical grommet sleeve comprising expandable fabric material, vertically oriented and suspended from the retaining ring;

wherein the retaining ring is encircled within a fold in the top end of the grommet sleeve created by bending the top end of the sleeve inward and downward 180 degrees, and wherein the top end is protected from fraying; and, a cylindrical grommet with a diameter substantially similar to the diameter of the retaining ring and configurable to fit within the desktop aperture.

11. The grommet apparatus of claim 10, wherein the retaining ring further comprises an opening in the perimeter of the ring creating two ring ends of equal shape, or unequal shape wherein one end of the two ring ends is tapered to facilitate removing and installing the ring with a hand tool.

12. The grommet apparatus of claim 11, wherein the grommet sleeve and retaining ring are not rotatable and are unable to move up or down through the desktop aperture.

13. The grommet apparatus of claim 10, further comprising a flat grommet plate configurable to be secured to an underside of the desk aperture, wherein the grommet plate comprises a centrally located aperture extending through the plate thickness comprising a aperture diameter substantially similar to or marginally less than the diameter of the desktop aperture.

14. The grommet apparatus of claim 10, wherein the desk is a height adjustable desk with the ability to move vertically up and down without impinging or damaging the electrical cable housed within the grommet sleeve.

15. A groin assembly for a computer desk, the desk comprising a desktop aperture configured to pass one or more electrical cables from the desktop surface to the desk undersurface, and the grommet assembly comprising:

a retaining ring comprising a hollow thin, flat, circular ring, wherein the diameter of the retaining ring is substantially similar to the diameter of the desktop aperture;

a hollow, cylindrical grommet sleeve comprising expandable fabric material, vertically oriented and suspended from the retaining ring;

wherein the retaining ring is encircled within a fold in the top end of the grommet sleeve created by bending the top end of the sleeve inward and downward 180 degrees, and wherein the top end is protected from fraying;

a cylindrical grommet with a diameter substantially similar to the diameter of the retaining ring and configurable to fit within the desktop aperture;

a flat grommet plate configurable to be secured to an underside of the desk aperture, wherein the grommet plate comprises a centrally located aperture extending through the plate thickness comprising a diameter substantially similar to, or marginally less than, the diameter of the desktop aperture; and, wherein the retaining ring and grommet sleeve are configurable to be secured within the desktop aperture and unable to move up or down or rotate.

16. The grommet assembly of claim 15, wherein the retaining ring and sleeve are secured into position by the retaining ring exerting an outward radial force against the desktop aperture interior wall.

17. The grommet assembly of claim 15, wherein the retaining ring and sleeve are secured into position by the retaining ring residing against the top surface of the plate when the diameter of the plate aperture is marginally smaller than the diameter of the desktop aperture.

18. The grommet assembly of claim 15, wherein the retaining ring and sleeve are secured into position by the retaining ring residing against the top surface of a ledge or within a groove carved into an interior wall of the desktop aperture.

19. The grommet assembly of claim 15, wherein the desk is a height adjustable desk with the ability to move vertically up and down without impinging or damaging an electrical cable housed within the grommet assembly.

\* \* \* \* \*